(12) United States Patent
Feldman

(10) Patent No.: US 7,406,510 B1
(45) Date of Patent: Jul. 29, 2008

(54) TECHNIQUES FOR ACCESSING PORTAL COMPONENTS

(75) Inventor: Ofer Feldman, Hertzelia (IL)

(73) Assignee: SAP Portals Israel Ltd., Ra'Anana (IL)

( * ) Notice: Subject to any disclaimer, the term of this patent is extended or adjusted under 35 U.S.C. 154(b) by 859 days.

(21) Appl. No.: 10/851,469

(22) Filed: May 21, 2004

(51) Int. Cl.
G06F 15/16 (2006.01)

(52) U.S. Cl. ............... 709/217; 709/201; 709/218; 709/219; 709/226; 709/229

(58) Field of Classification Search ............ 709/201, 709/217–219, 226, 229
See application file for complete search history.

(56) References Cited

U.S. PATENT DOCUMENTS

| | | | |
|---|---|---|---|
| 6,349,343 | B1 | 2/2002 | Foody et al. |
| 6,970,848 | B2* | 11/2005 | Osaka et al. ............ 705/51 |
| 2002/0078102 | A1* | 6/2002 | Dutta ............ 707/526 |
| 2003/0101216 | A1* | 5/2003 | Gupta ............ 709/203 |
| 2003/0105883 | A1 | 6/2003 | Gibbons |
| 2003/0237044 | A1 | 12/2003 | Hayer et al. |
| 2004/0002944 | A1* | 1/2004 | Hauser et al. ............ 707/1 |
| 2004/0003097 | A1 | 1/2004 | Willis et al. |
| 2004/0010598 | A1 | 1/2004 | Bales et al. |
| 2004/0046789 | A1 | 3/2004 | Inanoria |
| 2004/0049776 | A1 | 3/2004 | Fomenko et al. |
| 2005/0131866 | A1* | 6/2005 | Badros et al. ............ 707/3 |
| 2005/0262480 | A1 | 11/2005 | Pik et al. |
| 2006/0153121 | A1* | 7/2006 | Creamer et al. ............ 370/328 |

FOREIGN PATENT DOCUMENTS

WO  WO 2005/114388 A1  12/2005
WO  WO 2005/114389 A1  12/2005

OTHER PUBLICATIONS

U.S. Appl. No. 10/853,024, filed May 21, 2004, Pik et al.
U.S. Appl. No. 10/851,462, filed May 21, 2004, Pik et al.
"Achieving Interoperability: ILOG JRules, .NET and JNBridgePro," pp. 1-9.
"ASP.NET, Demonstrating Attributes and Reflection in .NET," contributed by Wrox Team, pp. 1-22 downloaded from http://www.devarticles.com/index2.php?option=content&task=view&id=362&pop=1&hi... on Nov. 17, 2004.
Cherng et al., "Contact First Web Services Interoperability between Microsoft .NET and IBM WebSphere," pp. 1-27 downloaded from http://msdn.microsoft.com/vstudio/java/interop/websphereinterop/default.aspx?print=true on Jan. 20, 2006.
Guest, S., "Web Services Interoperablilty Guidance (WSIG): IBM WebSphere Application Developer 5.1.2," pp. 1-16 downloaded from http://msdn.microsoft.com/vstudio/java/interop/strategies/default.aspx?pull=/library on Jan. 20, 2006.

(Continued)

Primary Examiner—Liangche A Wang
(74) Attorney, Agent, or Firm—Buckley, Maschoff & Talwalkar LLC

(57) ABSTRACT

Techniques that facilitate access to web components and resources provided by web servers. According to an embodiment of the present invention, information is stored for links that may be used by a user to automatically access a web component. An embodiment of the present invention is described below that stores and manages links that can be used to access portal components stored by a portal.

18 Claims, 7 Drawing Sheets

OTHER PUBLICATIONS

Guest, S., "Web Services Interoperability Guidance (WSIG): BEA WebLogic 8.1 SP3 (8.1.3)," pp. 1-10 downloaded from http://msdn.microsoft.com/vstudio/java/interop/strategies/default.aspx?pull=/library/en-us/.. on Jan. 20, 2006.

Herman, M., "Microsoft SharePoint Products and Technologies: Technical Overview," pp. 1-12 downloaded from http://www.microsoft.com/technet/prodtechnol/office/sps2003/plan/spst23to.mspx?pf=true on Nov. 23, 2004.

"Implementing Rich Collaboration Infrastructure Using Microsoft Windows SharePoint Services and Microsoft Office SharePoint Portal Server 2003," White Paper (2003).

International Search Report and Written Opinion for PCT application # PCT/EP2005/003530, Aug. 11, 2005.

International Search Report and Written Opinion for PCT application # PCT/EP2005/003528, Jul. 11, 2005.

"Interoperability between Java and Microsoft, Understanding the problems and solutions when integrating heterogeneous distributed computing environments," Whitepaper by Intrinsyc Software, pp. 1-14 (2005).

Intrinsyc Software Product Brochures and other materials downloaded from http:www.intrinsyc.com on Jan. 20, 2006.

"Introducing Visual Studio," web pages downloaded from http://msdn2.microsoft.com/library(d=printer)/fx6bk1 f4.aspx on Jan. 20, 2006.

"Java/.NET Interoperability: A detailed Comparison of Options," A JNBridge White Paper, pp. 1-7 downloaded from http://www.jnbridge.com/cgi-bin/downloads.pl?itemID=4&view=2 on Oct. 18, 2005, paper date Apr. 5, 2004.

"JNBridgePro™: A Technical Overview," White Paper, pp. 1-6 (2002-2005).

Preradovic, M., "Whitepaper: Microsoft .NET to J2EE Interoperability Performance Analysis," pp. 1-12 (2005).

"SAP Exchange Infrastructure: Process-centric collaboration," SAP White Paper, version 1.2, pp. 1-36 downloaded from http://www.isaca.be/Presentations/RT020928%0Exchange_White.pdf on Oct. 18, 2005, (2002).

"SAP Netweaver Platform Interoperability with IBM Websphere and Microsoft.NET," SAP White Paper, pp. 1-16 downloaded from http://www.sap.com/solutions/netweaver/pdf/BWP_Interoperability.pdf on Oct. 18, 2005, (2003).

"SAP© Enterprise Portal, Portal Infrastructure," pp. 1-16 (2003).

"SAP© Enterprise Portal—Portal Content," pp. 1-22 (2003).

"SharePoint Portal Server Deployment Resources," pp. 1-5 downloaded from http://office.microsoft.com/en-us/FX011442341033.aspx on Nov. 23, 2004.

"SharePoint Portal Server 2003 Product," pp. 1-2 downloaded from http://office.microsoft.com/office/sharepoint/prodinfo/default.mspx on Nov. 23, 2004.

"SharePoint Portal Server," pp. 1-2 downloaded from http://office.microsoft.com/en-us/FX010909721033.aspx on Nov. 23, 2004.

"Strategies for Interoperability," pp. 1-3 downloaded from http://msdn.microsoft.com/vstudio/java/interop/strategies/default.aspx on Jan. 20, 2006.

"Technical Note: JNBridgePro and Clustering," pp. 1-4 (2004).

Watts, M., "Solving the Enterprise Application Integration Challenge," brochure by Intrinsyc Software (2004).

* cited by examiner

TECHNIQUES FOR ACCESSING PORTAL COMPONENTS

CROSS-REFERENCES TO RELATED APPLICATIONS

The present application incorporates herein by reference for all purposes the entire contents of the following applications:

(1) U.S. Non-Provisional patent application Ser. No. 10/853,024 entitled "PORTAL RUNTIME FRAMEWORK" filed concurrently with the present application;

(2) U.S. Non-Provisional patent application Ser. No. 10/851,696 entitled "TECHNIQUES FOR DEVELOPING PORTAL SNIPPETS USING AN INTEGRATED DEVELOPMENT ENVIRONMENT (IDE)" filed concurrently with the present application; and (3) U.S. Non-Provisional patent application Ser. No. 10/851,462 entitled "DISPLAYING PORTAL INFORMATION" filed concurrently with the present application.

BACKGROUND OF THE INVENTION

The present application relates to the management and use of electronic links and more specifically to techniques for managing and using links to access components and resources in a distributed environment.

The popularity of distributed networks such as the Internet and the World Wide Web has given rise to a large number of servers offering services and resources of various sorts. Given the vast amount of information that is available over such distributed networks, it is becoming difficult for users to easily locate and access information and services that are relevant to a user. For example, users often want to access information that is customized and relevant to the user. To this end, web servers have been developed that enable a user to customize the content that is displayed to the user. Such servers are sometimes referred to as portals.

A portal provides a central gateway through which users can access various information sources and services/applications. A portal may provide access to several portal components including one or more portal pages, portal snippets, etc. A portal page may comprise one or more portal snippets that enable data to be retrieved and displayed on the portal page. Portal snippets are generally programs that retrieve data from an information resource and display it on a portal page. Examples of portal snippets include portlets, SAP's iViews, Plumtree's gadgets, Microsoft's web parts, etc. Portals generally allow a user to select and customize portal snippets that are included in the user's portal page or pages. In this manner, the user can customize the content that is retrieved and displayed on the user's portal page. Portal snippets may be developed using Integrated Development Environments (IDEs) such as Visual Studio .NET from Microsoft Corporation. In general, an integrated development environment (IDE) is a set of integrated tools for developing software.

Generally, when a user wishes to access a resource of component provided by a web server, the user has to connect to the appropriate web server, provide information such as user name and password that is used to authenticate the user, and upon successful authentication, browse to the component of interest to the user. For example, in order to access components (e.g., portal pages) stored by a portal, a user generally has to first connect to the portal. The user then has to provide information (e.g., user name, password) that is used to authenticate the user before the user can access portal components. Upon successful authentication, the user can then browse to the component that the user wishes to access. Accordingly, several time consuming activities (e.g., connecting to the portal, providing user name and password, browsing to the component of interest, etc.) have to be performed before a user can access a portal component of interest to the user. The problem is compounded when the user wishes to access components stored by multiple portals, each with their own connection and authentication requirements. Accordingly, techniques are desired that simplify user access to portal components and web server components in general.

BRIEF SUMMARY OF THE INVENTION

Embodiments of the present invention provide techniques that facilitate access to web components and resources provided by web servers. According to an embodiment of the present invention, information is stored for links that may be used by a user to automatically access a web component. An embodiment of the present invention is described below that stores and manages links that can be used to access portal components stored by a portal.

According to an embodiment of the present invention, techniques are provided for accessing a portal component stored by a portal from a plurality of portals. In this embodiment, information is received indicative of selection of a first link corresponding to a first portal component. A first portal instance is determined corresponding to the first link. Connection information is determined for the first portal instance, the connection information comprising information for connecting to a first portal from the plurality of portals. Authentication information is determined for the first portal instance, the authentication information comprising information for authenticating a user. Link information is determined for the first link, the link information comprising information used by the first portal to provide access to the first portal component. The first portal component is accessed using the connection information determined for the first portal instance, the authentication information determined for the first portal instance, and the link information determined for the first link.

According to another embodiment of the present invention, techniques are provided for facilitating access to components stored by a plurality of servers. In this embodiment, information is received identifying a first server from the plurality of servers. Connection information is received for the first server, the connection information comprising information for connecting to the first server. Authentication information is received for the first server, the authentication information comprising information for authenticating a user name. Link information is received for a first link, the link information for the first link comprising information used by the first server for providing access to a first component stored by the first server. The connection information for the first server, the authentication information for the first server, and the link information for the first link is stored.

According to yet another embodiment of the present invention, techniques are provided for providing links to portal components stored by a plurality of portals. In this embodiment, a set of one or more links is stored for each portal instance in a plurality of portal instances, each portal instance corresponding to a portal system from the plurality of portals. First information is received specifying a link. A link, as specified by the first information, is added to the set of links for each portal instance in the plurality of portal instances.

The foregoing, together with other features, embodiments, and advantages of the present invention, will become more

DETAILED DESCRIPTION OF THE INVENTION

In the following description, for the purposes of explanation, specific details are set forth in order to provide a thorough understanding of the invention. However, it will be apparent that the invention may be practiced without these specific details.

Embodiments of the present invention provide techniques that facilitate access to web components provided by web servers. According to an embodiment of the present invention, information is stored for links that may be used by a user to access a web component. An embodiment of the present invention is described below that stores and manages links that can be used to access components stored by a portal. For example, the links may be used to access portal components such as portal pages, portal snippets (that have been deployed or are being designed), etc. However, the general teachings of the present invention are not restricted to portals and may be applied to any server (e.g., a web server) coupled to a distributed network and that stores resources and components that can be accessed by users.

Figure 1:
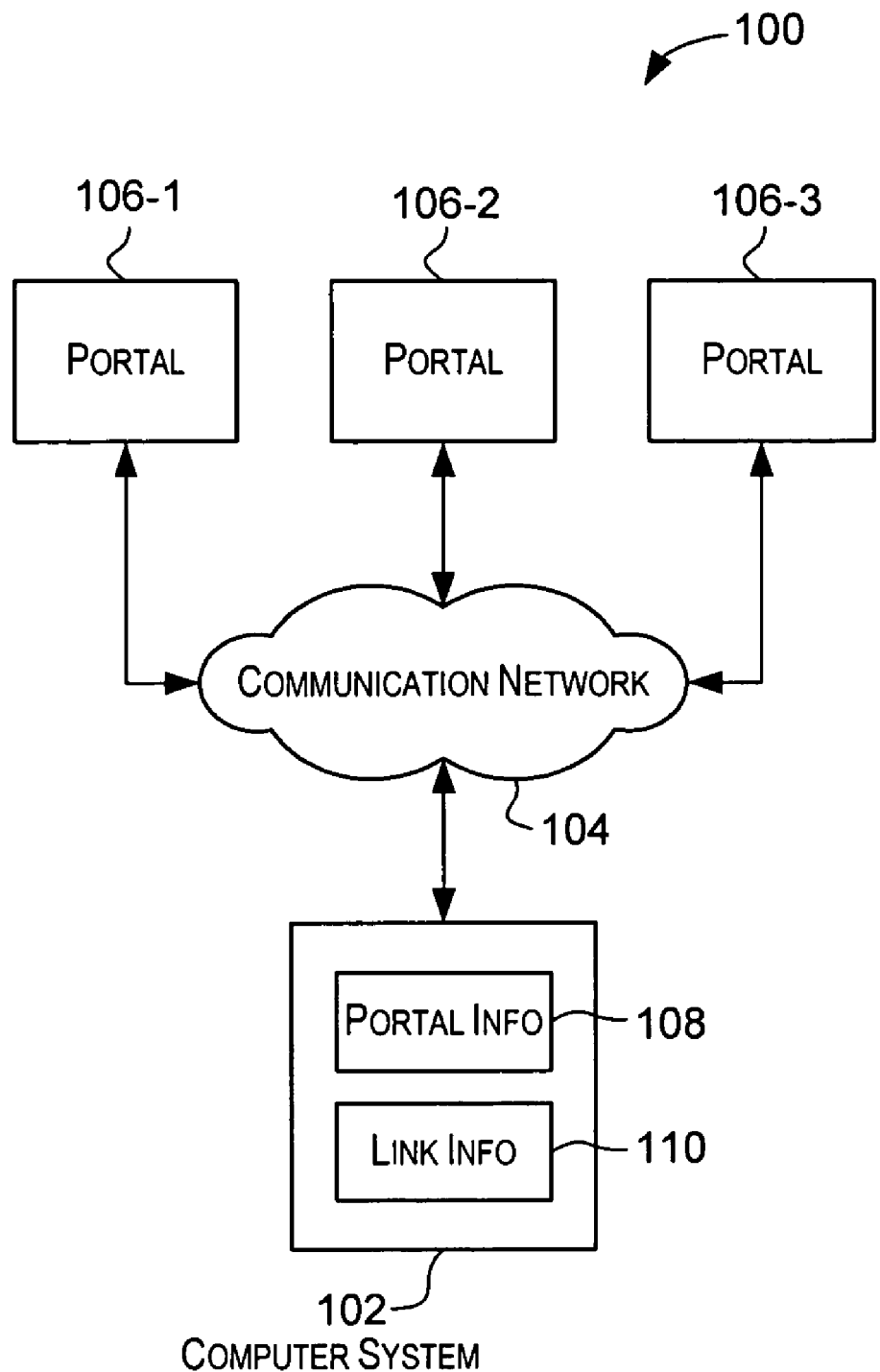
FIG. 1 is a simplified block diagram of a distributed network that may incorporate an embodiment of the present invention.

FIG. 1 is a simplified block diagram of a distributed network 100 that may incorporate an embodiment of the present invention. FIG. 1 is merely illustrative of an embodiment incorporating the present invention and does not limit the scope of the invention as recited in the claims. One of ordinary skill in the art would recognize other variations, modifications, and alternatives.

As depicted in FIG. 1, a computer system 102 is coupled to one or more portals 106-1, 106-2, and 106-3 via communication network 104. Communication network 104 may be a local area network (LAN), a wide area network (WAN), a wireless network, an Intranet, the Internet, a private network, a public network, a switched network, or any other suitable communication network. Communication network 104 may comprise many interconnected computer systems and communication links such as hardwire links, optical links, satellite or other wireless communications links, wave propagation links, or any other mechanisms for communication of information. Various communication protocols may be used to facilitate communication of information via communication network 104, including TCP/IP, HTTP protocols, extensible markup language (XML), wireless application protocol (WAP), protocols under development by industry standard organizations, vendor-specific protocols, customized protocols, and others.

Portals 106 are configured to provide portal services. A portal provides a central gateway through which users can access various information sources and services/applications. The information sources may include various applications (either internal or external to the portals), documents, sources from the Web, various databases, etc. A portal may store and provide access to several components including one or more portal pages, portal snippets, etc. A portal page may comprise one or more portal snippets that enable data to be retrieved and displayed on the portal page. Portal snippets are generally programs that retrieve data from an information resource and display it on a portal page. Examples of portal snippets include portlets, SAP's iViews, Plumtree's gadgets, Microsoft's web parts, etc. Portals generally allow a user to select and customize portal snippets that are included in the user's portal page or pages. In this manner, the user can customize the content that is retrieved and displayed on the user's portal page. A user may have personalized portal pages at different portals.

A portal snippet can be considered as an information query (or multiple queries) having one or more input parameters that is executed to retrieve information from one or more information sources. The parameters to the query and their values may be set by the portal administrator, the portal snippet designer, or some other user, or may be set by default. Each portal snippet is typically allocated a location on a page or screen where the retrieved information is to be displayed.

Various computing frameworks (e.g., Java 2 Platform, Enterprise Edition (J2EE) framework from Sun Microsystems, Inc., .NET framework from Microsoft Corporation, etc.) and programming languages (e.g., Java, C#, C++, ASP-.NET, Visual Basic, etc.) may be used to design a portal snippet. Portal snippets may be designed using various development environments such as Visual Studio .NET from Microsoft Corporation. A portal snippet may be deployed to multiple portals. Once deployed, a portal snippet is generally stored in a repository of the portal.

A user may use computer system 102 to access various components stored by one or more portals 106. The portal components may be accessed via various interfaces and/or applications executing on computer system 102. For example, a user may access a portal page using a browser (e.g., Internet Explorer from Microsoft Corporation) executing on computer system 102. A user may also use an IDE, such as Visual Studio .NET from Microsoft Corporation, to access portal components.

For example, a user may connect to a portal using a browser and access a portal page stored by the portal. The accessed portal page may comprise one or more portal snippets. When the portal page is accessed, the portal snippets associated with the page are automatically invoked. As a result of invocating a portal snippet, the one or more parameterized queries corresponding to the portal snippet are executed to obtain the relevant information from one or more information resources. Examples of queries include a query accessing stock information, a query accessing weather information, a query to access company news, query to access a particular set of documents, etc. The retrieved information is then displayed on the section of the page allocated to the portal snippet. The user may also access other portal components such as portal snippets that have been deployed to the portals.

Figure 2:
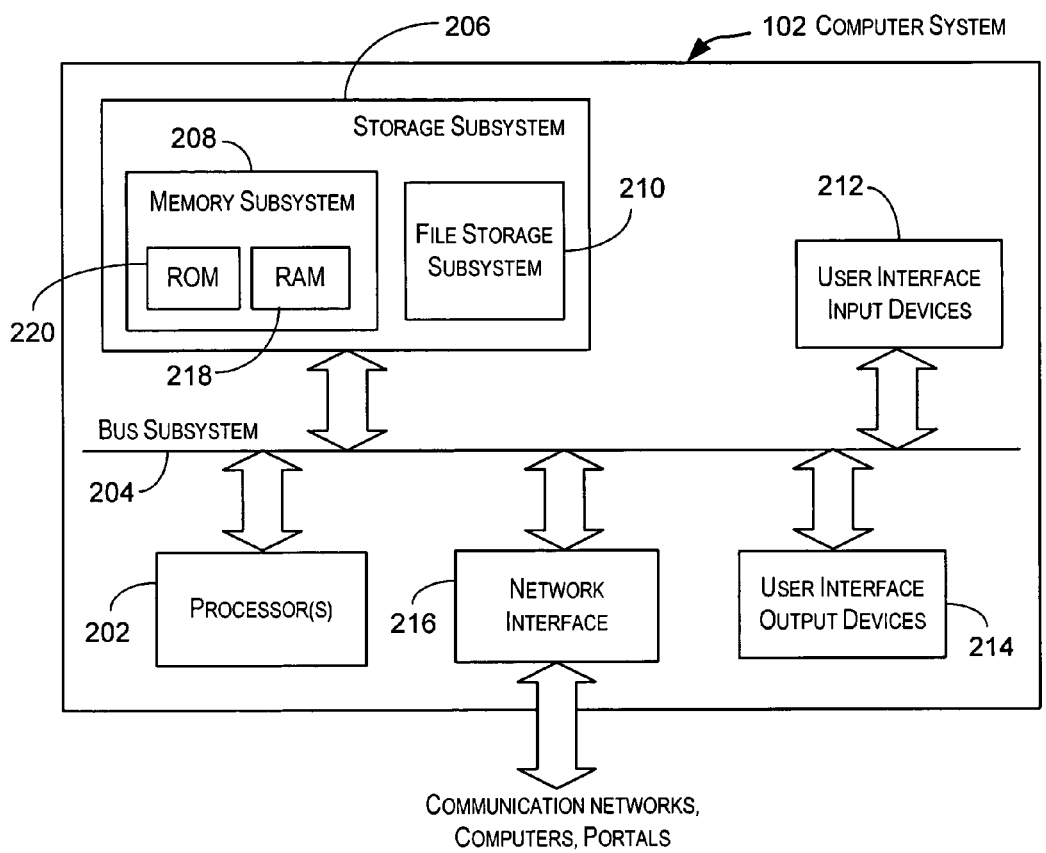
FIG. 2 is a simplified block diagram of a computer system that may be used to practice an embodiment of the present invention.

Computer system 102 may be a personal computer (PC), a PDA, a mobile phone, or any other computing device or data processing system. FIG. 2 is a simplified block diagram of a computer system 102 that may be used to practice as embodiment of the present invention. As shown in FIG. 2, computer system 102 includes a processor 202 that communicates with a number of peripheral devices via a bus subsystem 204. These peripheral devices may include a storage subsystem 206, comprising a memory subsystem 208 and a file storage subsystem 210, user interface input devices 212, user interface output devices 214, and a network interface subsystem 216.

Bus subsystem 204 provides a mechanism for letting the various components and subsystems of computer system 102 communicate with each other as intended. Although bus subsystem 204 is shown schematically as a single bus, alternative embodiments of the bus subsystem may utilize multiple busses.

Network interface subsystem 216 provides an interface to other computer systems including portal systems 106 and other networks. Network interface subsystem 216 serves as an interface for receiving data from other sources and for transmitting data to other sources from computer system 102. Embodiments of network interface subsystem 216 include an Ethernet card, a modem (telephone, satellite, cable, ISDN, etc.), (asynchronous) digital subscriber line (DSL) units, and the like.

User interface input devices 212 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 102.

User interface output devices 214 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 102. User interfaces according to the teachings of the present invention may be displayed by user interface output devices 214.

Storage subsystem 206 may be configured to store the basic programming and data constructs that provide the functionality of the present invention. For example, information related to portals and links to portal components may be stored by storage subsystem 206. Software code modules that provide the functionality of the present invention may also be stored in storage subsystem 206. These software modules may be executed by processor(s) 202. Storage subsystem 206 may also provide a repository for storing data used in accordance with the present invention. For example, information related to the various portals and links may be stored in storage subsystem 206. Storage subsystem 206 may comprise memory subsystem 208 and file/disk storage subsystem 210.

Memory subsystem 208 may include a number of memories including a main random access memory (RAM) 218 for storage of instructions and data during program execution and a read only memory (ROM) 120 in which fixed instructions are stored. File storage subsystem provides persistent (non-volatile) computer-readable medium allowing storage for program and data files, any may include a hard disk drive, a floppy disk drive along with associated removable media, a Compact Disk Read Only Memory (CD-ROM) drive, an optical drive, removable media cartridges, and other like storage media.

Computer system 102 can be of various types including a personal computer, a portable computer, a workstation, a network computer, a mainframe, a kiosk, or any other data processing system. Due to the ever-changing nature of computers and networks, the description of computer system 102 depicted in FIG. 2 is intended only as a specific example for purposes of illustrating the preferred embodiment of the computer system. Many other configurations having more or fewer components than the system depicted in FIG. 2 are possible.

According to an embodiment of the present invention, computer system 102 is configured to facilitate access to components of one or more portals 106 using links. The portal components may include portal pages, portal snippets stored by portals, etc. Computer system 102 is configured to store and manage information that enables specification and management of links and use of the links to automatically access portal components in an easy and quick manner.

In order to facilitate automatic access to portal components, computer system 102 is configured to store information (referred to as "portal information") 108 related to portals 106 that store the components to be accessed and information 110 ("link information") for links that a user may use to access the portal components. The portal information and link information is persistently stored and thus available across multiple sessions. In alternative embodiments, the portal information and link information, or portions thereof, may be stored by other systems coupled to computer system 102 from where it can be accessed by computer system 102.

According to an embodiment of the present invention, portal information may be stored for various portal instances, where a portal instance corresponds to a particular portal. Multiple portal instances may correspond to the same portal. Portal instances corresponding to the same portal may have different portal information associated with them.

For each portal instance, the portal information may include connection information that is used to connect to a portal corresponding to the portal instance. For example, the connection information associated with a portal instance corresponding to a particular portal may comprise information identifying a host name or address of the particular portal, information identifying a port of the particular portal, information identifying a communication protocol to be used for connecting to the particular portal, and the like.

The portal information associated with a portal instance may also include authentication information that is used for authenticating a user that wishes to connect to and access services and components provided by the portal. For example, the authentication information for a portal instance may include, a user name and a password associated with the user name that is used for authenticating the user and enabling access to portal components. The portal information associated with a portal instance may also comprise other information such as information identifying a connection time out value, properties of the portal, etc.

As previously stated, multiple portal instances may be defined for a particular portal. For example, a first and a second portal instance may correspond to the same portal. The portal information associated with the first portal instance may however be different from the portal information associated with the second portal instance. For example, the first and second portal instances may have the same connection information but different authentication information (e.g., user name, password) associated with them. This may be useful in a situation where a user wants to connect to the same portal system as different users. The user may connect to the portal as a first user using the first portal instance and connect to the same portal as a second user using the second portal instance.

Figure 3:
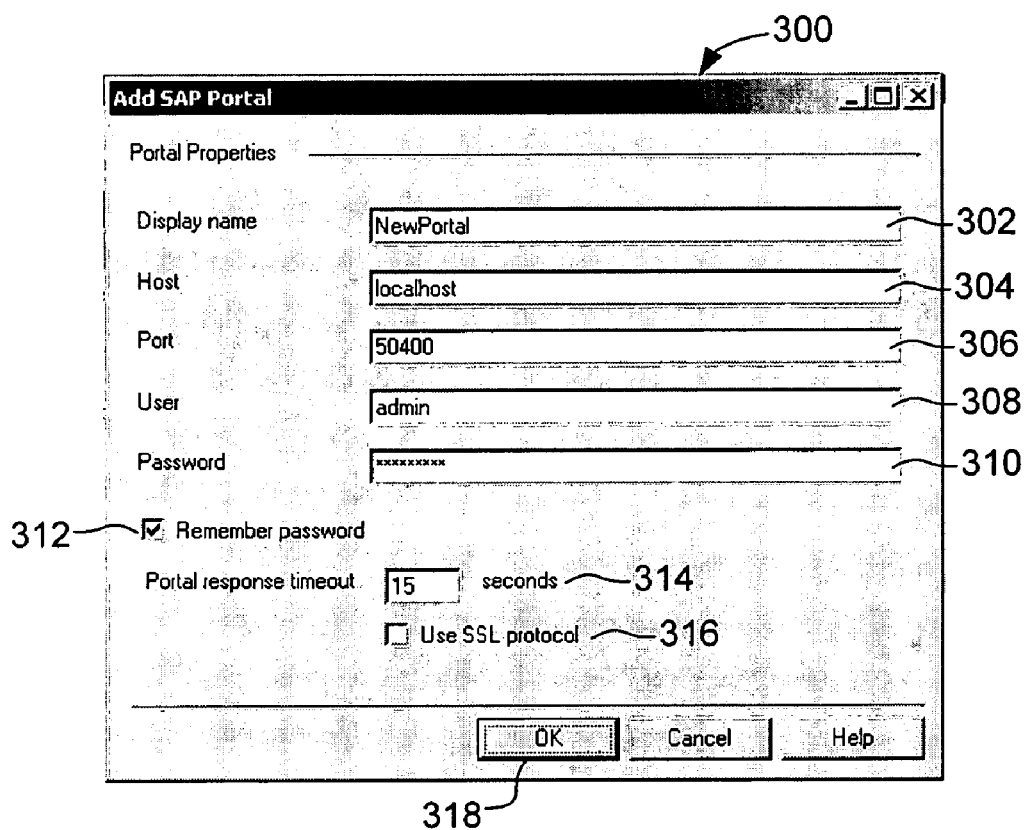
FIG. 3 depicts a user interface for specifying portal information according to an embodiment of the present invention.

Various techniques may be used for providing portal information for the various portal systems (or portal instances). According to one embodiment, a user interface may be provided that enables a user to specify portal information for a portal instance. FIG. 3 depicts a user interface 300 for specifying portal information according to an embodiment of the present invention. As depicted in FIG. 3, graphical user interface 300 comprises various input fields for entering values for properties of a portal instance. The user may specify a label to be associated with the portal instance in field 302. The label specified in field 302 is used to identify the portal instance, for example, when displayed in a graphical user interface. A host name or address and a port number for a portal corresponding to the portal instance may be specified in fields 304 and 306. A user name may be specified in field 308 and an associated password that is to be used for authenticating the user may be specified in field 310. Graphical user interface 300 provides an option 312 which when checked indicates that the password entered in 310 is to be remembered across application sessions. A portal response timeout parameter may be specified in field 314. This parameter identifies the timeout value (e.g., in seconds) for portal requests. The user may also specify whether or not to use a secure protocol (e.g., SSL, https) using option 316. If the SSL box is checked, it indicates that SSL is to be used for communicating with the portal.

According to an embodiment of the present invention, some of the fields of graphical user interface 300 may be identified as mandatory fields, i.e., the user has to enter a value for these fields. "OK" button 318 may be enabled only when information for the mandatory fields has been entered. For example, in one embodiment, "Display name" 302, "Host" 304, "Port" 306, "User" 308, and "password" 310 may be designated as the mandatory fields. After the requisite information has been entered into graphical user interface 300, the specified portal information for the portal instance is stored by computer system 102 upon selecting "OK" button 318.

As previously stated, in addition to portal information, computer system 102 is also configured to store link information for links that may be used to access portal components according to the teachings of the present invention. Each link may correspond to a particular portal component that may be accessed using that link. The link information for a particular link may comprise information identifying a portal component to be accessed using the particular link. The link information may also comprise information that is used by a portal server to provide access to the portal component corresponding to the particular link. For example, in one embodiment, the link information for a link may comprise information identifying the location of the portal component pointed to by the link on the portal. The link information may also comprise information such as user personalization information that is used by the portal server to provide the appropriate component to the requesting user.

The link information may also include information identifying a label or identifier that is used for identifying and displaying the link. The link information may also include other information related to the link.

According to an embodiment of the present invention, links and associated link information may be specified by a user. For example, the user may specify one or more links to be managed according to the teachings of the present invention. The links may point to portal components that are relevant to the user and/or are frequently accessed by the user. As part of specifying a link, the user may identify a portal that stores the component that is accessible using the link.

Figure 4:
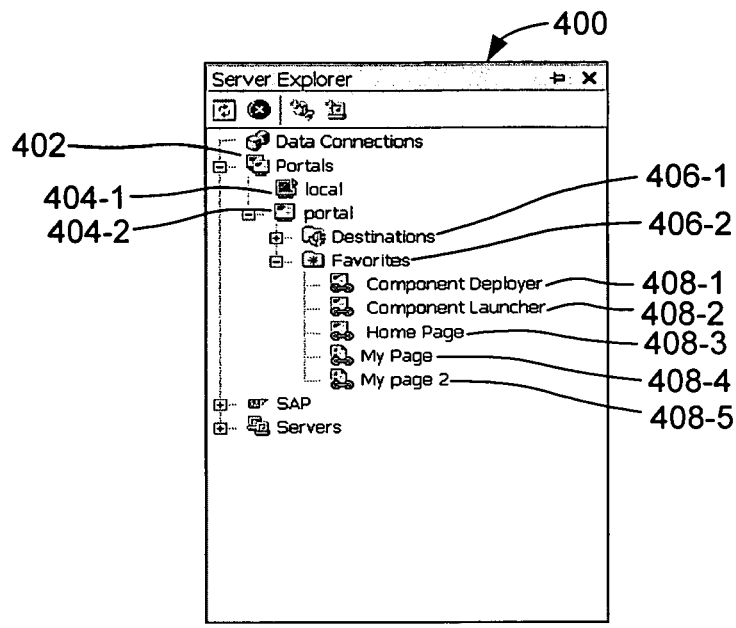
FIG. 4 depicts a user interface displaying portals and links to portal components according to an embodiment of the present invention.

FIG. 4 depicts a user interface 400 displaying portals and links to portal components according to an embodiment of the present invention. FIG. 4 is merely illustrative of a graphical user interface according to an embodiment of the present invention and is not intended to limit the scope of the invention as recited in the claims. One of ordinary skill in the art would recognize other variations, modifications, and alternatives.

Graphical user interface 400 depicted in FIG. 4 is a Server Explorer Tool Window that is part of Microsoft's Visual Studio .NET IDE. In Visual Studio .NET, the Server Explorer is a tool window that displays information about available servers and databases. Server Explorer is the server management console for Visual Studio .NET. The Server Explorer can be used to open data connections to servers and explore their databases and system services. A user can drag nodes from Server Explorer and drop them onto Visual Studio .NET designers. This creates new data components that are preconfigured to reference the item dropped. The scope of the present invention is however not limited to IDE interfaces. The portals and links information may also be displayed in other types of user interfaces.

In FIG. 4, the functionality of the Server Explorer window is extended to display portal instances and links to portal components. A set of portal instances are displayed under a "Portals" node 402 including portal instances "local" 404-1 and "portal" 404-2. Portal instance "portal" 404-2 has been expanded to show folders "Destinations" 406-1 and "Favorites" 406-2 for the portal instance. Folders provide a way of organizing information for each portal instance. In FIG. 4, links to portal components for portal instance "portal" are displayed under "Favorites" folder 406-2. "Favorites" folder 406-2 thus provides a convenient mechanism for organizing links to portal components defined for "portal" 404-2 portal instance. As shown, five links (408-1, 408-2, 408-3, 408-4, and 408-5) are displayed. Each link corresponds to and can be used to access a particular portal component stored by a portal corresponding to portal instance "portal" 404-2. A label or identifier is displayed fro each link (e.g., "Component Deployer", "Component Launcher", "Home Page", My Page, My Page 2"). The links may point to portal components that are frequently accessed by the user.

Links may be specified for multiple portal instances. According to an embodiment of the present invention, a folder such as "Favorites" folder 406-2 depicted in FIG. 4 may be provided for each portal (or portal instance) and used to organize links to portal component stored by a portal corresponding to the portal instance.

In one embodiment, information may be displayed for a portal instance that conveys information about the connection status of the portal corresponding to the portal instance. For example, the links for a portal instance may be displayed only if the portal corresponding to the portal instance is connected to ("live" portal) computer system 102. In this embodiment, if a portal is not connected, then the links to components of that portal are also not displayed.

Different criteria may be used to determine whether or not a portal is connected. In one embodiment, a portal is deemed connected to a computer system if the computer system can send information to the portal and receive information from the portal. In other embodiments, a timeout connectivity parameter may be specified. In such embodiments, a portal is deemed connected to a computer system if the computer system can receive a response from the portal within the timeout threshold time limit. Accordingly, in such embodiments, a portal is deemed disconnected if the response from the portal is not received within the timeout threshold limit, even though the response might potentially be received from the portal at some later time. In other embodiments, a portal is deemed disconnected even if it can send and receive information but the authentication attempt fails.

In some embodiments, a link to a portal component is not displayed if the portal component corresponding to the link is unavailable (even though the portal storing the portal component may itself be connected and available). In this manner, only those links that can actually be used to access available portal components are displayed.

Figure 5:
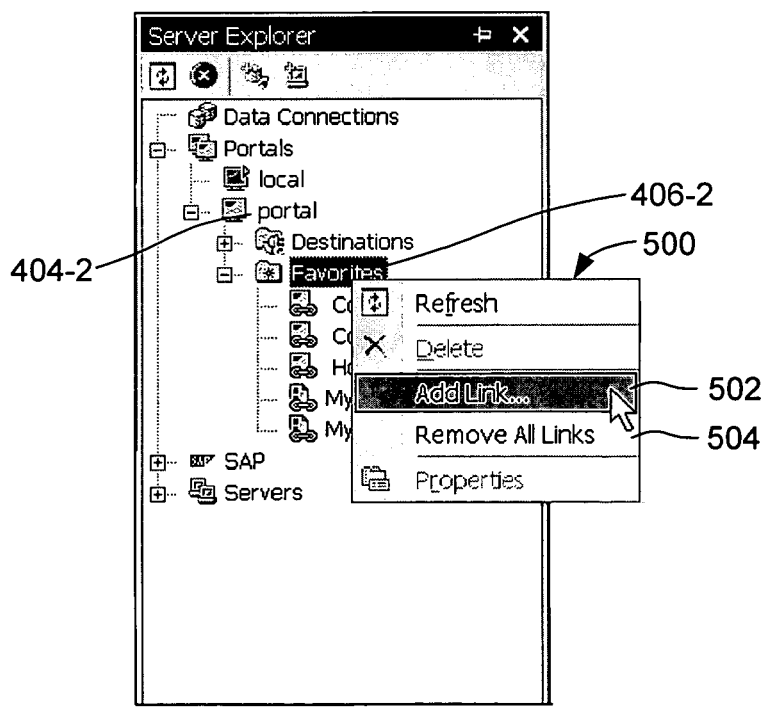
FIG. 5 depicts a user interface for adding a link according to an embodiment of the present invention.

Various techniques may be used to add a link to a "Favorites" folder for a portal instance. According to one technique, for the embodiment depicted in FIG. 4, a user may select a "Favorites" folder for a particular portal instance using an input device such as a mouse, invoke a menu, and then select a menu option for adding a new link to the selected Favorites folder. For example, as depicted in FIG. 5, the user has selected "Favorites" folder 406-2 for portal instance "Portal" 404-2 and invoked menu 500 by clicking the right mouse button. Menu 500 comprises several user-selectable menu items including a menu item "Add Link . . . " 502 for adding a new link. Selection of "Add Link . . . " 502 invokes an "Enter Link Details" dialog box 600 depicted in FIG. 6A.

Figure 6A:
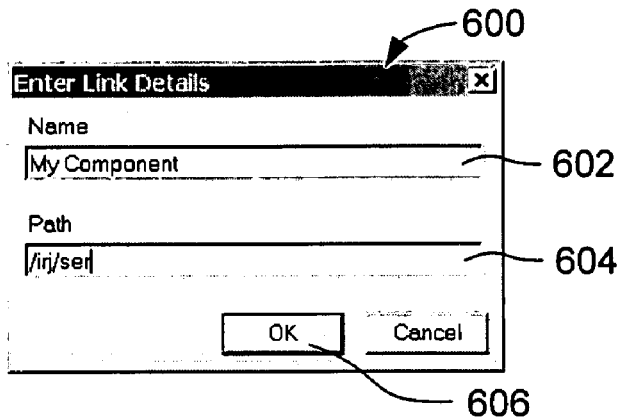
FIGS. 6A and 6B depict user interfaces for specifying links information according to an embodiment of the present invention.

Dialog box 600 provides several input fields for entering link information. The user may enter a name (or label) for the link in field 602. The name is used to identify and display the link in a user interface. The user may also specify link information for the link via interface 600. For example, in the embodiment depicted in FIG. 6A, the user may enter the location of portal component to be accessed using the "My Component" link. As shown in FIG. 6A, the user has entered a pathname "/irj/ser" identifying the location of the portal component that is pointed to by link. A portal storing the component may use the pathname to determine the location of the component to the access. Selection of "OK" button 606 stores the user-specified link information. The link is then added to the "Favorites" folder of the portal instance and may be displayed in FIG. 4.

There are various ways in which a user can specify link information for a link. For example, lets us assume that the user wants to specify link information for a link where the link information identifies a location of a portal component. As previously described, according to one technique, the user may specify the location information by manually entering the information (e.g., path information) in field 604 of GUI 600. According to another technique, the user may also cut-and-paste the information from a browser. For example, the user may have manually navigated to a particular portal component using a browser. The URL line of the browser identifies the address of the portal component that the user has accessed. For example, the URL address may look something like "https://portalsserver5:50501/irj/path/comp1.comp". The first part of the URL address comprises the host, port, and protocol information for the portal. The second part of the URL address (e.g., "/irj/oath/comp1.comp") identifies the location of the portal component. According to an embodiment of the present invention, the user may copy the full URL address from the URL address line of the browser and paste it into field 604. According to the teachings of the present invention, the URL address is automatically parsed to determine the portion of the URL address that identifies the location of the portal component. The location information is then stored as link information for the link. The rest of the information that includes information related to the host, port, protocol, etc. of the portal system is not stored as the information can be retrieved from the portal information associated with the portal.

The previous sections describe how a user may add a link to a particular portal instance. Embodiments of the present invention also enable the user to easily add a link simultaneously to multiple portal instances. For example, a user may add a particular link to all the portal instances that have been configured (and displayed in FIG. 4). This causes the link to be added to the Favorites folder of each portal instance that has been configured. According to an embodiment of the present invention, the link is also automatically added to portal instances that may be configured in the future. Adding a link to multiple portal instances is also referred to as "globally" adding a link.

Figure 6B:
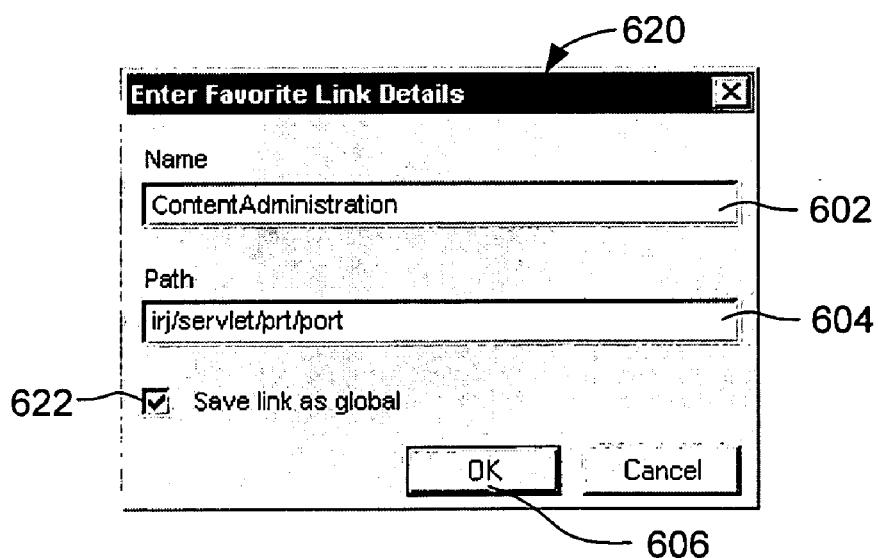

FIG. 6B depicts a user interface 620 that may be used to add a link globally according to an embodiment of the present invention. As depicted in FIG. 6B, interface 620 is similar to interface 600 depicted in FIG. 6A comprising a field 602 for entering link name information and a field 604 for entering component location information. Additionally, interface 620 comprises a user-selectable option 622 that the user can set to add the link globally to all the portal instances that have been configured and that may be configured in the future. For example, if the user selects option 622 and then selects "OK" button 606, the user-specified link is added to each defined portal instance (e.g., added to the "Favorites" folder of each portal instance). If the user adds a new portal instance, then the link is automatically added for the newly configured portal instance.

Interface 620 depicted in FIG. 6B is one of several techniques that may be used for adding a link globally to the various portal systems. Various other techniques may also be used for globally adding links such as using commands, menus, etc. In one embodiment, a system administrator for a distributed environment may specify one or more links to be globally added to all the portal instances configured by users of the distributed environment and any newly added portal instances. In another embodiment, the application (e.g., IDE, browser) that is used to display the portals and links information may be configured to add links (generally links to commonly used portal components) on a global basis. For example, one or more links may be globally added upon installation of the product or application.

As indicated above, in certain embodiments, when a link is marked as "global", the link is added not only to portal instances that have been presently defined by a user but also to portal instances that the user may define in the future. Information is stored identifying which links are marked as global. When a portal instance is created, the information identifying the global links is checked to determine the links to be added to the newly created portal instance.

As described above, links may be added on a per portal instance basis (also referred to as "local" links) or may be added globally to all the configured portal instances (referred to as "global" links). Information is stored to identify which links are local and which are global. When the links are displayed in a user interface, such as in user interface 400 depicted in FIG. 4, information may be displayed to indicate whether a particular link is a global link or a local link. For example, different colors, icons, fonts, styles, etc. may be used to differentiate between global and local links.

The ability to add a link globally is useful and convenient in many circumstances. For example, a particular portal component may be deployed to several portals. Deployment of a portal component (e.g., a portal snippet) to a portal includes preparing an archive of files related to the portal component and communicating the archive to the portal server for subsequent use at the portal server. The deployed portal component is generally stored in a repository in the portal server. According to an embodiment of the present invention, during deployment, the portal component and files related to the portal component are packaged as a portal archive (PAR) and the PAR is then communicated to the portal system for subsequent use.

A portal component may be deployed to several portals. In such a scenario, the user may want to specify a link to access each portal component (e.g., a portal snippet) deployed to the several portals. Even though the same portal component is being deployed to the various portals, the portal information for each portal may be different. The ability to add the link globally to all the portal systems provides a convenient way of adding links to the deployed component to the different portals without having to add the link one at a time to each separate portal system.

Figure 7:
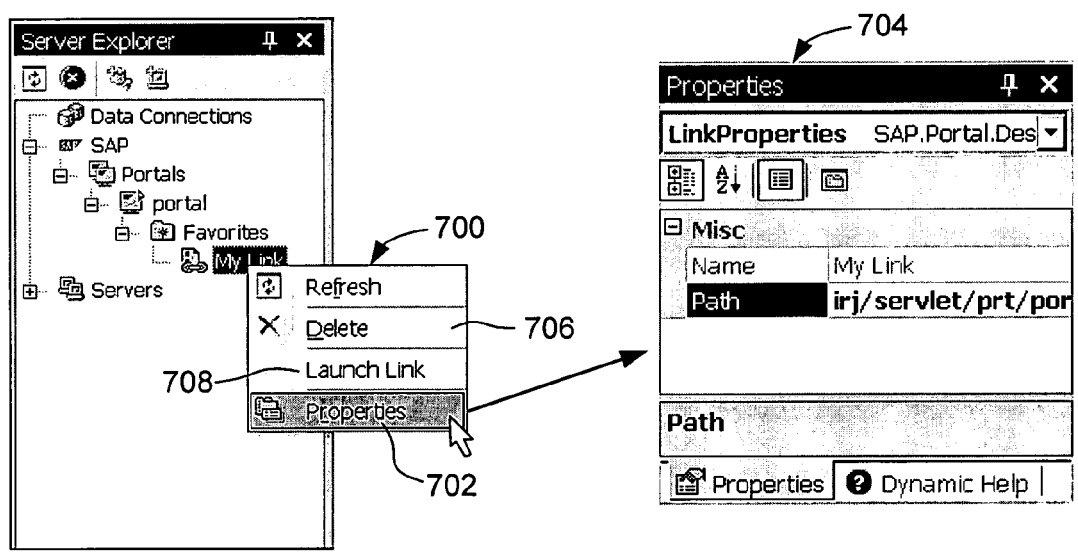
FIG. 7 depicts a menu that enables editing of link information for a link according to an embodiment of the present invention.

A user may also change link information for previously-specified links. FIG. 7 depicts a menu 700 that enables editing of link information for a link according to an embodiment of the present invention. Menu 700 may be invoked by selecting a link to be edited and then by right-clicking the mouse. Menu 700 comprises several user-selectable menu items including a "Properties" item 702 for editing link information. In one embodiment, dialog box 704 is displayed upon selecting menu item "Properties" 702. The existing values of the link name and path are displayed in dialog box 704. The user may edit the displayed values. The link information for the link is then updated to reflect the modified values.

Techniques are also provided for deleting previously configured links to portal components. Individual links may be deleted by selecting a link and then deleting the link. For example, menu 700 depicted in FIG. 7 comprises a "Delete" menu item 706 that may be used to delete a link. The user may select the link to be deleted and then select "Delete" menu item 706 to delete the selected link.

Alternatively, techniques are also provided for simultaneously deleting multiple links. For example, all the links in a Favorites folder for a portal instance may be deleted by selecting the particular Favorites folder and then issuing a command to delete all the links in the folder. In one embodiment, menu 500 depicted in FIG. 5 may be invoked after selecting a folder whose links are to be deleted. Menu 500 comprises a "Remove All Links" menu item 504 which when selected deletes all the links in the selected folder. Options may also be provided for deleting the links of all the portals (i.e., deleting links on a global basis).

There are several ways in which a link may be used to automatically access a portal component corresponding to the link (also referred to as "launching the link"). According to one technique, the user may launch a link by double-clicking on it using an input device such as a mouse. This enables the user to automatically connect to the portal system and access the portal component corresponding to the link. According to the teachings of the present invention, when a link for a particular portal instance is launched, the connection information associated with the particular portal instance is used to automatically connect to the portal corresponding to the portal instance. The authentication information associated with the portal instance is used to automatically complete authentication operations. Upon successful authentication, the link information associated with the launched link is then provided to the portal which provides access to the appropriate portal component identified by the link information. In this manner, the connection, authentication, and access operations are all automatically performed. Details related to the automatic connection and authentication operations are described below with respect to FIG. 8.

A user may also launch a link by first selecting the link to be launched and then selecting a menu-item to launch the link. For example, menu 700 depicted in FIG. 7 comprises a "Launch Link" menu item 708 which when selected launches the selected link.

Figure 8:
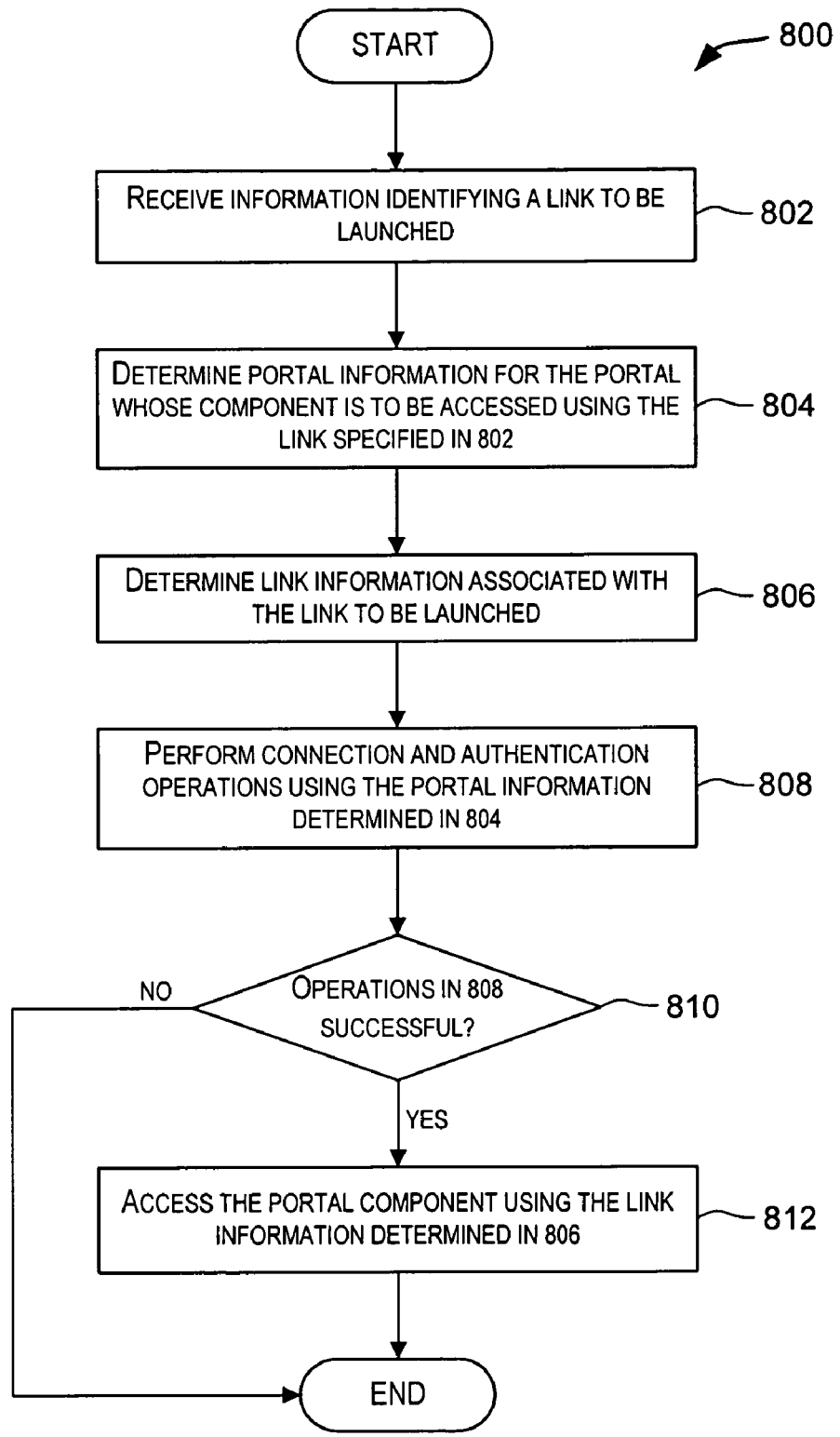
FIG. 8 is a simplified high-level flowchart depicting a method of launching a link according to an embodiment of the present invention.

FIG. 8 is a simplified high-level flowchart 800 depicting a method of launching a link according to an embodiment of the present invention. The method depicted in FIG. 8 may be performed by software modules executed by a processor, hardware modules, or combinations thereof. Flowchart 800 depicted in FIG. 8 is merely illustrative of an embodiment of the present invention and is not intended to limit the scope of the present invention. Other variations, modifications, and alternatives are also within the scope of the present invention. The method depicted in FIG. 8 may be adapted to work with different implementation constraints.

As depicted in FIG. 8, processing is initiated upon receiving information identifying a particular portal component link to be launched (step 802). As previously described, various different techniques may be used for launching a link. The information received in 802 may also identify a portal (or portal instance) whose component is to be accessed using the specific link. Alternatively, the portal whose component is to be accessed may be determined from information identifying the launched link.

Portal information for the portal system (or portal instance) whose component is to be accessed is then determined (step 804). This information may be determined from information received in 802. In one embodiment, the portal instance whose link is selected is determined. Portal information associated with the portal instance is then determined. The portal information determined in step 804 may include connection information (e.g., host information for the portal, port information for the portal, protocol information for the portal), authentication information for the portal (e.g., user name, password), and other information. The connection information comprises information that is used for connecting to the portal. The authentication information is used for authentication purposes and may comprise a user name and a password to be used for authentication.

Link information is then determined for the link to be launched (step 806). The link information comprises information that is used by the portal for retrieving the requested portal component and providing it to the user.

Connection and authentication operations are then performed for the portal whose component is to be accessed using the portal information determined in 804 (step 808). If the connection and authentication operations in 808 are successful (step 810), then the portal component corresponding to the link identified in 802 is accessed using the link information determined in 806 (step 812). The portal server may communicate the requested portal component to the computer system that was the source of the portal component request. The accessed portal component may then be displayed to the user via a graphical user interface on the user's computer system. For example, if the portal component is a portal page, then the portal page may be displayed to the user in a browser.

The following example illustrates some of the features of the present invention. Let's assume that three portal instances have been defined, namely Portal1, Portal2, and Portal3. Fur ther, let us assume that the portal information for the portal instances comprises the following:

Portal1: Host=localhost, Port=1000, SSL checkbox=not checked, User: yossi, Password: ****
Portal2: Host=oph2, Port=13000, SSL checkbox=checked, User: ofer, Password: ****
Portal3: Host=ph1, Port=50000, SSL checkbox=not checked, User: admin, Password: ****

The user may open a browser and manually navigate to a certain component of Portal1. This manual navigation generally involves manual connection to the portal and authentication. The user may then decide to add a link to the portal component under the "Favorites" folder of portal instance Portal1. To do this, the user may cut the URL from the browser URL line (which may look like "http://localhost:1000/irj/servlet/prt/portal/prtroot/PortalAnywhere.Go") and paste it in field 604 of interface 600 depicted in FIG. 6A or FIG. 6B. The user may name the link "my_link".

As described above, according to the teachings of the present invention, only the relative portion of the URL address is stored for the portal link. Accordingly, the URL is automatically parsed and truncated such that the location information that is stored for the link "my_link" under Portal1 is "/irj/servlet/prt/portal/prtroot/PortalAnywhere.Go".

The user may then add the "my_link" link to the "Favorites" folder of the other portals (i.e., Portal2 and Portal3) also. The user may do this by setting the "Save link as global" option 622 in user interface 620 depicted in FIG. 6B. Alternatively, the user may add the link individually to the other portal instances.

After a "my_link" link has been added to the Favorites folder of portal instances Portal1, Portal2, and Portal3, the links may be used to access the portal components. For example, the user may select link "my_link" from the Favorites folder of Portal2. Upon selecting the link, a browser is opened with the following URL address: "https://oph2:13000/irj/servlet/prt/portal/prtroot/PortalAnywhere.Go".

The host and port information is determined from the portal information associated with Portal2. The user is automatically connected as user "ofer" and authenticated using authentication information (User: ofer, Password: ****) associated with Portal2. The particular portal component is accessed using the location or path information determined from the link information associated with the "my_link" link.

The user may also select link "my_link" from the Favorites folder of Portal3. Upon selecting the link, a browser is opened with the following URL address: "http://ph1:50000/irj/servlet/prt/portal/prtroot/PortalAnywhere.Go". The host and port information is determined from the portal information associated with Portal3. The user is automatically connected as "admin" and authenticated using authentication information (User: admin, Password: ****) associated with Portal3. The particular portal component is accessed using the location or path information determined from the link information associated with link.

Further, as previously indicated, two portal instances may refer to the same actual portal server, but with different user and passwords. Links may be added for each portal instance to access the same portal component. Accordingly, when a user uses the link under a first portal instance to access the portal component, the user is automatically connected to the portal server corresponding to the first portal instance and authenticated using the "user" and "password" associated with the first portal instance. When the user uses the link under the second portal instance to access the same portal component, the user is automatically connected to the portal server corresponding to the second portal instance (that is the same portal server as the portal server corresponding to the first portal instance) and authenticated using the "user" and "password" associated with the second portal instance. Accordingly, the links enable the user to customize the manner in which a particular portal component is to be accessed.

The links provide a convenient, simple, and efficient way for the user to automatically access portal components. Unlike conventional techniques, the user does not have to manually perform connection, authentication, and browsing operations to access a portal component. These operations are automatically performed using the portal information. Further, the links can be easily managed, for example, using the user interfaces described above. The links may be conveniently used to access portal pages, link to uploaded or deployed portal components, access pages for deploying portal snippets, portal pages for launching portal snippets, portal logon pages, portal home pages, etc.

While embodiments of the present invention have been described above for accessing portal components, the teachings of the present invention are not restricted to accessing portal components. In general, embodiments of the present invention provide links for accessing resources stored by servers in a distributed environment. The distributed environment may comprise multiple servers each storing one or more resources. Embodiments of the present invention provide techniques for managing links to the resources and using the links to automatically access the resources. According to an embodiment of the present invention, server information (like portal information) is stored for a set of servers. The server information for a server may comprise connection information (e.g., network connection information) that is used to connect to the server. The server information may also comprise authentication information that is used to authenticate the user.

The user may define one or more links to resources (e.g., documents) stored by a server. For example, a set of links (e.g., a set of links to favorites) to frequently used resources of server may be defined. The link information for a link to a resource on a server stores information (e.g., path information) specifying the location of the resource on the server relative to the server location. The user may then use the links to access the resource. As part of the access, the server information may be used to automatically connect to the server and perform any authentication operations, and the link information is used to automatically access the appropriate resource. In this manner, the links enable a user to access server resources without having to manually connect to a server and perform any authentication operations.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof. For example, the processing performed by the present invention, as described above, may be implemented in hardware chips, graphics boards or accelerators, etc.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. In a distributed network comprising a plurality of portals, a computer-implemented method comprising:
storing a set of links for each portal instance in a plurality of portal instances, each portal instance corresponding to a portal system from a plurality of portals;
receiving information defining a new first link for a first portal instance in the plurality of portal instances, along with a first user-selected indication that the new first link is not global;
adding the new first link to the set of links associated with the first portal instance without adding the new first link to the sets of links associated with other portal instances;
receiving information defining a new second link for the first portal instance, along with a second user-selected indication that the new second link is global;
adding information about the new second link to the set of links associated with the first portal instance;
adding information about the new second link to other sets of links associated with other portal instances;
receiving information indicative of selection of the new first link corresponding to a first portal component;
determining the first portal instance corresponding to the new first link;
determining connection information for the first portal instance, the connection information comprising information for connecting to a first portal from the plurality of portals;
determining authentication information for the first portal instance, the authentication information comprising information for authenticating a user;
determining link information for the new first link, the link information comprising information used by the first portal to provide access to the first portal component; and
accessing the first portal component using the connection information determined for the first portal instance, the authentication information determined for the first portal instance, and the link information determined for the new first link.

2. The method of claim of 1 wherein the connection information for the first portal instance comprises at least one of information identifying a host of the first portal, information identifying a port of the first portal, and information identifying a communication protocol for communicating with the first portal.

3. The method of claim of 1 wherein the information for authenticating the user comprises a user name and a password and further wherein different user names and passwords are associated with the new second link in connection with different portal instances.

4. The method of claim of 1 wherein accessing the first portal component comprises:
connecting to the first portal using the connection information determined for the first portal instance;
performing authentication using the authentication information determined for the first portal instance; and
accessing the first portal component using the link information determined for the new first link.

5. The method of claim of 4 wherein:
the first portal component is a portal page; and
accessing the first portal component comprises displaying the portal page in a browser.

6. The method of claim of 1 further comprising:
displaying the plurality of portal instances; and
displaying, for each portal instance, the one or more links included in the set of portal links associated with the portal instance.

7. The method of claim 6 wherein the plurality of portal instances comprises a second portal instance corresponding to the first portal.

8. A computer program product stored on a computer-readable medium, the computer program product comprising:
code for storing a set of links for each portal instance in a plurality of portal instances, each portal instance corresponding to a portal system from a plurality of portals;
code for receiving information defining a new first link for a first portal instance in the plurality of portal instances, along with a first user-selected indication that the new first link is not global;
code for adding the new first link to the set of links associated with the first portal instance without adding the new first link to the sets of links associated with other portal instances;
code for receiving information defining a new second link for the first portal instance, along with a second user-selected indication that the new second link is global;
code for adding information about the new second link to the set of links associated with the first portal instance;
code for adding information about the new second link to other sets of links associated with other portal instances;
code for receiving information indicative of selection of the new first link corresponding to a first portal component;
code for determining the first portal instance corresponding to the new first link;
code for determining connection information for the first portal instance, the connection information comprising information for connecting to a first portal from the plurality of portals;
code for determining authentication information for the first portal instance, the authentication information comprising information for authenticating a user;
code for determining link information for the new first link, the link information comprising information used by the first portal to provide access to the first portal component; and
code for accessing the first portal component using the connection information determined for the first portal instance, the authentication information determined for the first portal instance, and the link information determined for the new first link.

9. The computer program product of claim 8 wherein the connection information for the first portal instance comprises at least one of information identifying a host of the first portal, information identifying a port of the first portal, and information identifying a communication protocol for communicating with the first portal.

10. The computer program product of claim 8 wherein the information for authenticating the user comprises a user name and a password.

11. The computer program product of claim 8 wherein the code for accessing the first portal component comprises:
code for connecting to the first portal using the connection information determined for the first portal instance;

code for performing authentication using the authentication information determined for the first portal instance; and code for accessing the first portal component using the link information determined for the new first link.

12. The computer program product of claim of 11 wherein:
the first portal component is a portal page; and
the code for accessing the first portal component comprises code for displaying the portal page in a browser.

13. The computer program product of claim 8 further comprising:
code for displaying the plurality of portal instances; and
code for displaying, for each portal instance, the one or more links included in the set of portal links associated with the portal instance.

14. The computer program product of claim 13 wherein the plurality of portal instances comprises a second portal instance corresponding to the first portal.

15. A distributed network comprising:
a plurality of portals; and
a computer system coupled to the plurality of portals;
wherein the computer system is configured to:
store a set of links for each portal instance in a plurality of portal instances, each portal instance corresponding to a portal system from a plurality of portals;
receive information defining a new first link for a first portal instance in the plurality of portal instances, along with a first user-selected indication that the new first link is not global;
add the new first link to the set of links associated with the first portal instance without adding the new first link to the sets of links associated with other portal instances;
receive information defining a new second link for the first portal instance, along with a second user-selected indication that the new second link is global;
add information about the new second link to the set of links associated with the first portal instance;
add information about the new second link to other sets of links associated with other portal instances;
receive information indicative of selection of the new first link corresponding to a first portal component;
determine the first portal instance corresponding to the new first link;
determine connection information for the first portal instance, the connection information comprising information for connecting to a first portal from the plurality of portals;
determine authentication information for the first portal instance, the authentication information comprising information for authenticating a user;
determine link information for the new first link, the link information comprising information used by the first portal to provide access to the first portal component; and
access the first portal component using the connection information determined for the first portal instance, the authentication information determined for the first portal instance, and the link information determined for the new first link.

16. The network of claim 15 wherein the connection information determined for the first portal instance is used to connect to the first portal, authentication is performed using the authentication information determined for the first portal instance, and the first portal component is accessed using the link information determined for the new first link.

17. The network of claim 15 wherein the computer system is configured to:
display the plurality of portal instances; and
display, for each portal instance, the one or more links included in the set of portal links associated with the portal instance.

18. An apparatus for accessing a portal component stored by a portal from a plurality of portals, the apparatus comprising:
means for storing a set of links for each portal instance in a plurality of portal instances, each portal instance corresponding to a portal system from a plurality of portals;
means for receiving information defining a new first link for a first portal instance in the plurality of portal instances, along with a first user-selected indication that the new first link is not global;
means for adding the new first link to the set of links associated with the first portal instance without adding the new first link to the sets of links associated with other portal instances;
means for receiving information defining a new second link for the first portal instance, along with a second user-selected indication that the new second link is global;
means for adding information about the new second link to the set of links associated with the first portal instance;
means for adding information about the new second link to other sets of links associated with other portal instances;
means for receiving information indicative of selection of the new first link corresponding to a first portal component;
means for determining the first portal instance corresponding to the new first link;
means for determining connection information for the first portal instance, the connection information comprising information for connecting to a first portal from the plurality of portals;
means for determining authentication information for the first portal instance, the authentication information comprising information for authenticating a user;
means for determining link information for the new first link, the link information comprising information used by the first portal to provide access to the first portal component; and
means for accessing the first portal component using the connection information determined for the first portal instance, the authentication information determined for the first portal instance, and the link information determined for the new first link.

* * * * *